G. F. CASE.
Improvement in Automatic Fans.
No. 128,589.                                   Patented July 2, 1872.
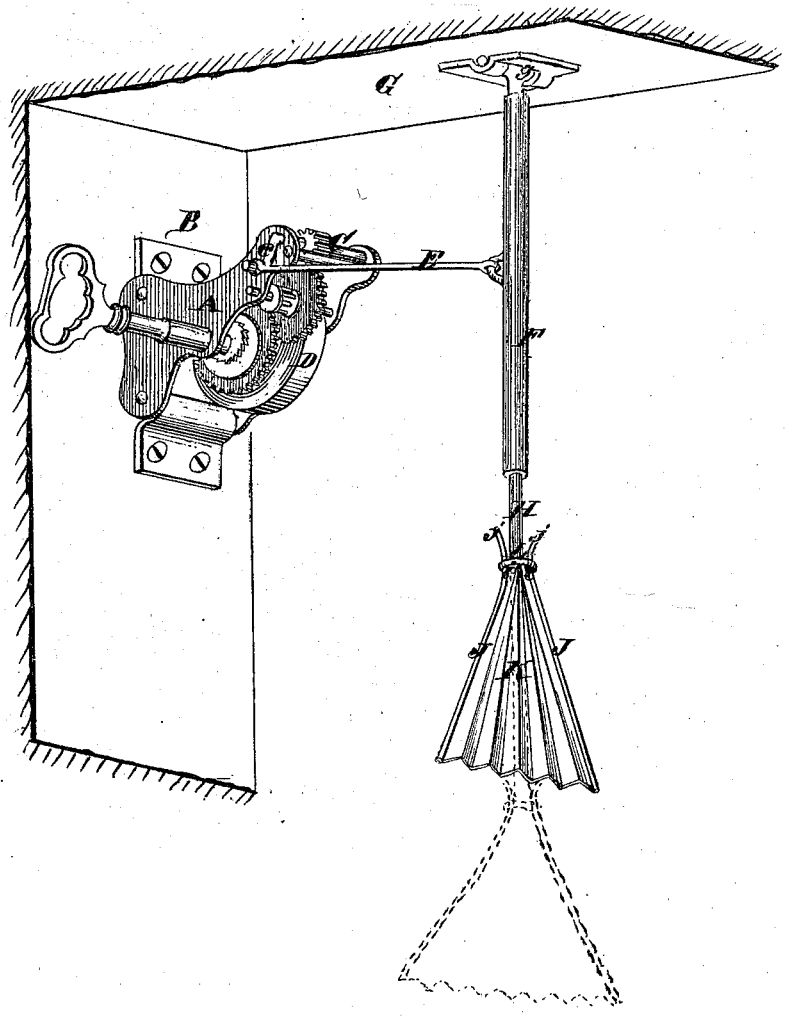
ATTEST.
Walter Allen
W. H. Pearce
INVENTOR.
Geo. F. Case
By Knight Bros. Attys.

128,589

UNITED STATES PATENT OFFICE.

GEORGE F. CASE, OF CLAREMONT, NEW HAMPSHIRE, ASSIGNOR OF ONE-THIRD OF HIS RIGHT TO LEWIS R. McCORD, OF ST. LOUIS, MO.

IMPROVEMENT IN AUTOMATIC FANS.

Specification forming part of Letters Patent No. 128,589, dated July 2, 1872.

Specification describing a certain Automatic Fan, invented by GEORGE F. CASE, of Claremont, in the county of Sullivan and State of New Hampshire.

My improvement consists of a motor (such as clock-work) attached to the wall head-board of a bed, or other suitable place, and having a crank connected by a rod to an oscillating rod hung to the ceiling; the said rod being extensible in length and carrying a fan, constructed as hereinafter described, so to be adjustable in size.

The drawing is a perspective view of my improvement.

A is a system of spring clock-work, attached to the wall or upright B. C is a shaft, driven by the spring D, acting through the medium of more or less multiplying-wheels. The shaft C ends in a crank, c, connected by a rod, E, to the pendulous fan-rod F. This rod is hung at g to the ceiling G, or other suitable place, and is preferably made tubular to receive an adjustable rod, H, to whose lower end are pivoted at i the metallic rods J, to which the sides of the fan K are attached. The fan K is radially corrugated so as to admit of being folded together, or spread out more or less, in the manner of a common corrugated fan. The side rods J have at the upper ends, above the pivots i, out-curved horns j. L is a ring, which is slipped downward over the rods J to contract the fan, or slipped upward to draw inward the horns j, to expand the fan to any desired area. The object of making the fan expansible is, chiefly, to regulate the speed at which the clock-work runs; but, in addition to this means of regulating the speed, I may combine with my apparatus a balance-wheel or weighted pendulum and escapement.

The fan may be raised or lowered, as shown by dotted lines, by slipping the rod H in the tubular rod F; or, if preferred, the rod F may be made solid, and the rod H made tubular or connected therewith by jaws or sockets upon said rod H. The raising or lowering of the fan would act as a speed-regulator.

I claim as my invention—

The combination of the actuating mechanism A C D E, extensible pendant F H, adjustable fan J K, and ring L, substantially as and for the purpose set forth.

GEO. F. CASE.

Witnesses:
SAML. KNIGHT,
CHARLE PICKLES.